Dec. 27, 1960 W. E. GIFFORD 2,966,035

REFRIGERATION METHOD AND APPARATUS

Filed Aug. 4, 1959 8 Sheets-Sheet 1

INVENTOR.
William E. Gifford
BY
Attorney

INVENTOR.
William E. Gifford
BY [signature]
Attorney

Dec. 27, 1960 W. E. GIFFORD 2,966,035

REFRIGERATION METHOD AND APPARATUS

Filed Aug. 4, 1959 8 Sheets-Sheet 3

INVENTOR.
William E. Gifford
BY Bessie A. Lepper
Attorney

INVENTOR.
William E. Gifford
BY Bessie A. Lepper
Attorney

INVENTOR.
William E. Gifford
BY
Attorney

INVENTOR.
William E. Gifford
BY Bernie G. Lyons
Attorney

INVENTOR.
William E. Gifford
BY Bessie A. Lyons
Attorney

INVENTOR.
William E. Gifford
BY Bernie G. Lynne
Attorney

United States Patent Office 2,966,035

Patented Dec. 27, 1960

2,966,035

REFRIGERATION METHOD AND APPARATUS

William E. Gifford, Lexington, Mass., assignor to Arthur D. Little, Inc., Cambridge, Mass., a corporation of Massachusetts Filed Aug. 4, 1959, Ser. No. 831,596

38 Claims. (Cl. 62—6)

This invention relates to process and apparatus for developing extremely low temperatures.

The invention relates more specifically to a process and apparatus for producing net refrigeration in a system wherein all of the work extracted from compressing, cooling and expanding a fluid is in the form of thermal energy, whereby the fluid leaving the system is at a temperature higher than at which it entered the system.

This application is a continuation-in-part of my co-pending application, Serial No. 696,468, filed November 14, 1957, now abandoned.

A principal object of this invention is to provide an improved method and apparatus for producing extremely low temperatures (as low as 4.2° K.) with a high degree of efficiency. Another object is to provide an improved method and apparatus for producing refrigeration by processing a fluid through a cycle of compression and expansion thus avoiding the use of an expansion engine or turbine and similarly avoiding the use of complicated equipment and valving which accompany these more usual methods of achieving refrigeration. It is yet another object of this invention to provide an apparatus for refrigeration which is free from the necessity of using low-temperature seals, from difficult problems of alignment and adjustment and from supplementary cooling means such as coils and the like. It is another object to provide methods and apparatus for refrigeration which furnish a simple means for liquefying helium. These and other objects will be apparent in the following description.

There are described and known in the prior art a number of cycles and their apparatus for achieving refrigeration. Many such cycles are based upon the use of expansion engines or turbines. Others involve complicated heat exchange systems, while still others (although somewhat more simple in design) require tightly-fitting pistons and sealing rings which must be capable of operation under extremely low temperatures. The method and apparatus of this invention eliminate or materially lessen the disadvantages associated with the systems in the prior art as will be evident from the description and discussion below.

The fluid refrigeration method of this invention comprises supplying an initial quantity of refrigeration fluid at a given temperature and under high pressure along a path to an enclosed space, removing and storing heat from the fluid during supply along said path thereby initially cooling the fluid, continuing supply of high pressure fluid throughout said initial cooling thereby to maintain said high pressure by addition of fluid until a final quantity of cooled fluid under said high-pressure is supplied to said space, discontinuing supply of high pressure fluid, effecting expansion of said final quantity of fluid by delivery of heat energy external of said space thereby further to cool and extract energy from the fluid in said space, and exhausting the further cooled fluid from said space through said path, the further cooled fluid receiving heat previously stored along said path and leaving said path at a temperature above that at which it was supplied whereby more heat is taken out than was brought in by said supply.

In a co-pending application filed in the names of Howard O. McMahon and William E. Gifford, Serial No. 696,506, now Patent No. 2,906,101, there is disclosed and claimed the fluid refrigeration method generic to the one disclosed and claimed herein. The improvement disclosed and claimed in my Serial No. 696,468, of which this application is a continuation-in-part, concerns the delivery of heat energy external of the refrigeration system as distinguished from the delivery of mechanical energy external of the system. Thus, the cycle of this application may be termed a "no-work" cycle and is achieved, as will be apparent in the following description, by removing more sensible heat from the system than is taken in by the refrigerating fluid.

As a first modification of the method of this invention, the fluid may be supplied to a plurality of enclosed spaces, each succeeding space being adapted to receive a portion of the fluid and to be maintained at a temperature lower than the preceding one. In this modification, the fluid is introduced by branching paths into the spaces after removing and storing heat from it before entering the branching paths.

A second modification of this method of refrigeration involves the use of out-of-contact heat exchangers along with a Joule-Thomson valve to achieve temperatures sufficiently low to liquefy helium. Other modifications are also disclosed which may be employed to increase the efficiency of the method and apparatus of this invention.

Apparatus improvements are disclosed herein which incorporate heat exchangers, heat stations, means for controlling fluid flow, and means for modifying the thermal characteristics of displacers and cylinders.

The apparatus of this invention comprises cylinder means, displacer means movable within said cylinder means, first and second chambers the volumes of which are defined by the movement of said displacer means, conduit means connecting said first and second chambers, thermal storage means associated with said conduit means, means for imparting predetermined motion to said displacer means, the displacer motion being defined in four steps and consisting of dwelling in an uppermost position, moving downwardly, dwelling in a lowermost position and moving upwardly, respectively; supply reservoir means for supplying high-pressure fluid, exhaust reservoir means for receiving low-pressure fluid, valve means associated with said supply and exhaust reservoir means and controlled to cause high-pressure fluid to enter said first chamber and said conduit during said first and second steps of said displacer motion and to exhaust low-pressure fluid during said third and fourth steps of said displacer motion.

This invention will now be further described with reference to the accompanying drawings in which.

In Figs. 1–4, for convenience in describing the cycle of this invention, the apparatus is shown in simple form. (The descriptions and discussions of the modifications of this apparatus given below will present the apparatus in greater detail.)

Figure 1:
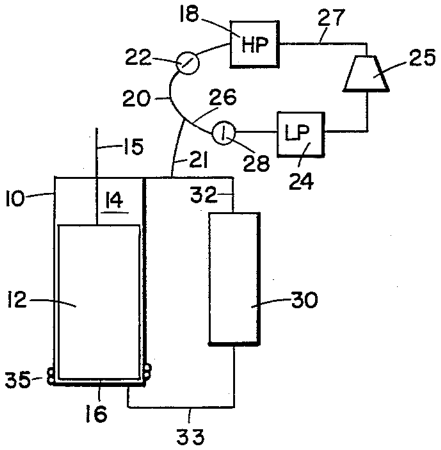
Figs. 1–4 are simplified diagrammatic views of the apparatus of this invention illustrating the four steps in the cycle.
Figure 2:
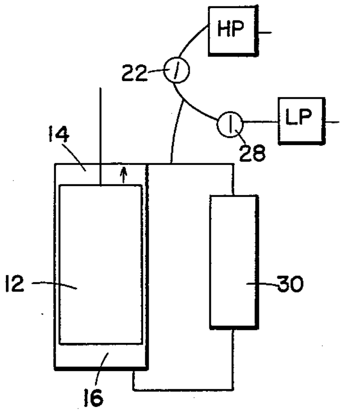

In Fig. 1, a cylinder 10 is provided with a displacer 12 which is moved by suitable means, for example, by an operating rod 15 or the like, moving through the end of cylinder 10. Vertical motion of displacer 12 provides chambers 14 and 16, the volumes of which are controlled by the movement of displacer 12.

A source or reservoir of high-pressure gas 18 is provided to furnish working fluid by way of line 20 (controlled by valve 22) and line 21 to the first or upper chamber 14 of the cylinder. Similarly a low-pressure reservoir 24 is connected by line 26 (controlled by valve 28) and line 21 to upper chamber 14 and to line 32 which leads into a regenerator 30. The bottom portion of regenerator 30 is connected by way of line 33 to the bottom or second chamber 16 of cylinder 10. There is also provided a compressor 25 which is located between the high-pressure and low-pressure reservoirs 24 and 18 and connected therewith by line 27. Refrigeration from the system may be extracted by suitable means such as coils 35.

Figure 7:
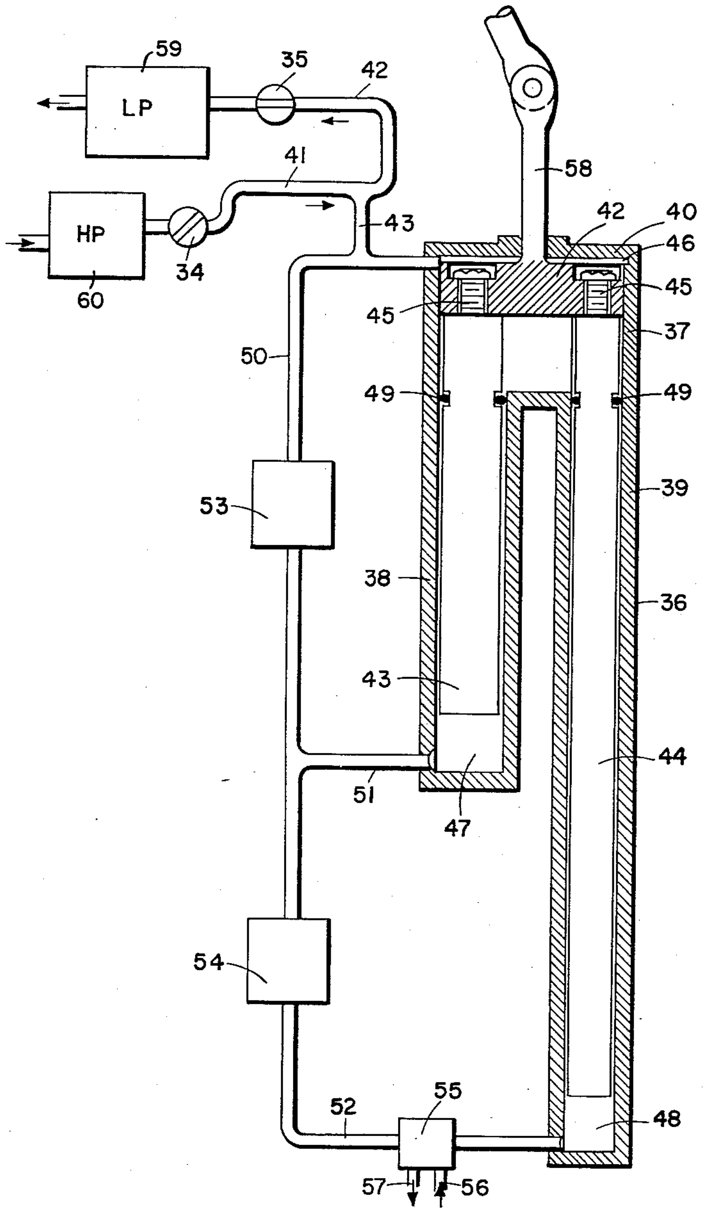
Fig. 7 is a modification of the apparatus showing the use of multiple displacers.
Figures 8, 9:
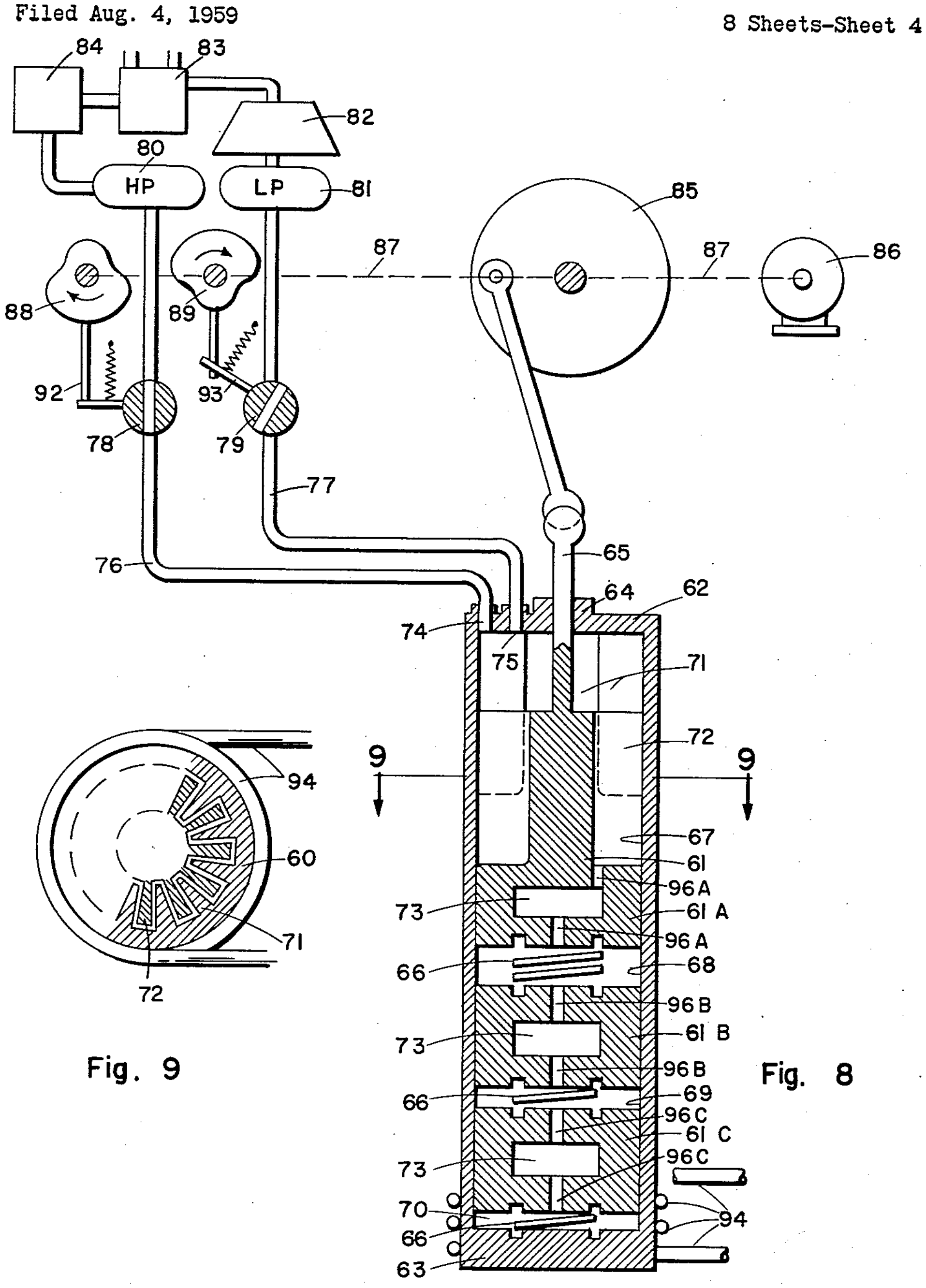
Fig. 8 is a diagrammatic view, shown partly in vertical section, of another modification of the refrigeration apparatus according to this invention.
Fig. 9 is a cross-sectional view of the apparatus of Fig. 8 along lines 9—9 of Fig. 8.

In alternative arrangements, it will be seen that a plurality of displacers may be used (Fig. 7) or that the regenerator 30 may be located in the central portion of the displacer (Figs. 8 and 9).

Figure 3:
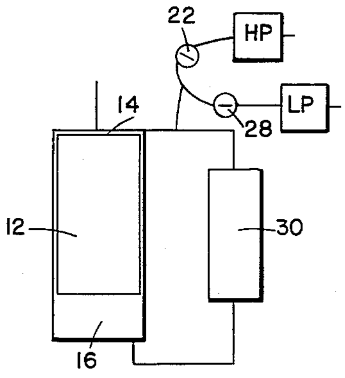
Figure 4:
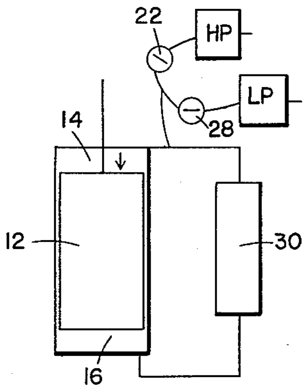
Figure 5:
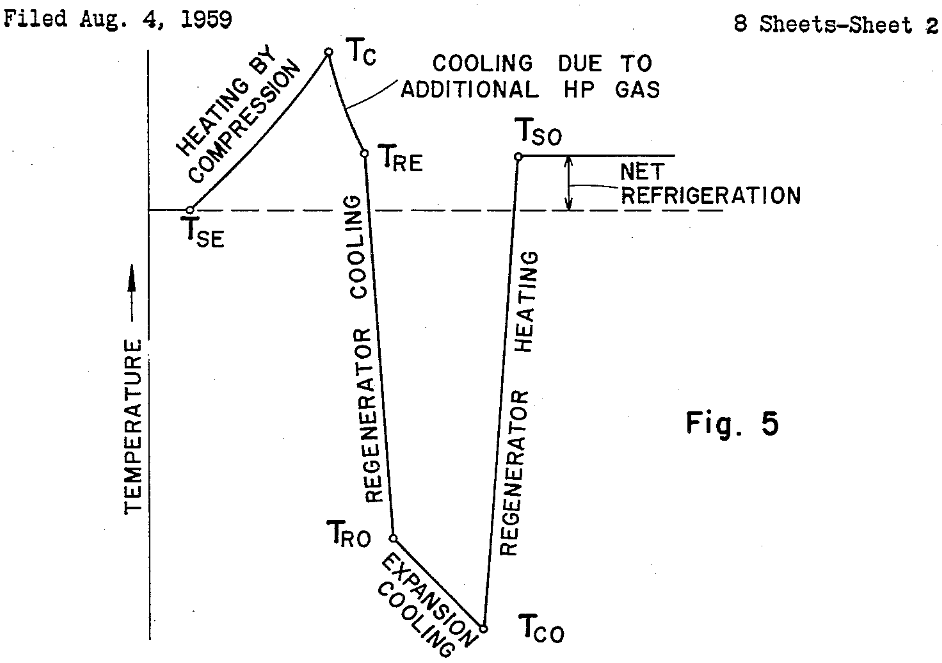
Fig. 5 is a diagrammatic representation of the temperature cycle of this invention.
Figure 6:
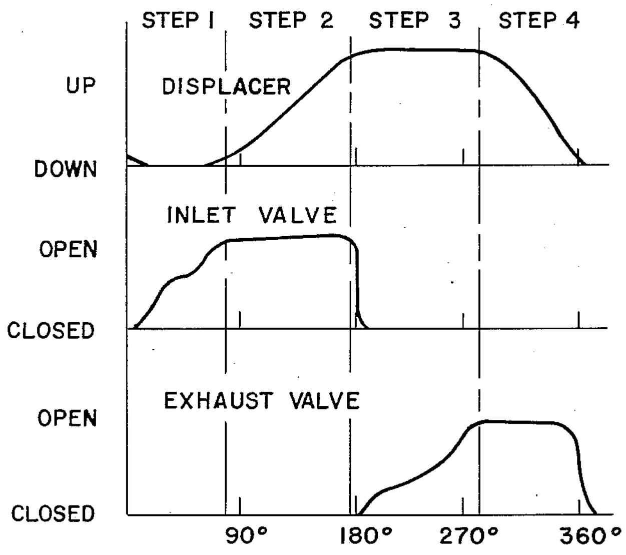
Fig. 6 illustrates a typical operational sequence for the cycle of this invention.

Using the apparatus and drawings of Figs. 1–4 along with the temperature history diagram of Fig. 5 and the operational sequence diagram of Fig. 6, the cycle of this invention may be described as consisting of four steps. These steps are each discussed in detail below, both with reference to the manner in which the refrigeration cycle is begun and in the manner in which it continues to operate.

In step 1 (see Fig. 1), the displacer dwells in its bottommost position, which means that the first or upper chamber 14 is at its maximum volume. In this step, valve 22 is opened permitting high-pressure fluid to flow into chamber 14 and to compress the low-pressure gas contained therein (as will be later explained in connection with step 4). In the process of compressing the gas in chamber 14, heat is generated. This is illustrated in Fig. 5 where it is seen that the temperature of the fluid entering the system, $T_{SE}$, is raised to $T_C$, the temperature after compression.

The operational sequence illustrated in Fig. 6 shows that during step 1, in a typical cycle, the displacer is caused to dwell for about 70° of the rotation of the displacer cam the timing of which is represented in Fig. 6. The intake valve 22 (Fig. 1) is opened in a manner to permit essentially constant flow of fluid from the high-pressure reservoir 18.

In step 2 (Fig. 2), gas is transferred to the low-temperature or bottom portion of the cylinder. During this step, the displacer is moved upwardly at an essentially constant rate (Fig. 6) and the hot compressed gas forced out through line 32 into the regenerator 30. Simultaneously, high-pressure gas from the high-pressure reservoir continues to flow by virtue of the fact that valve 22 remains open throughout this step (Fig. 6). This additional supply of high-pressure gas is added to the hot compressed gas at a point beyond that at which the latter leaves the upper chamber 14. This additional gas supply is at room temperature and therefore cools the stream of hot compressed gas as indicated in Fig. 5 to an intermediate temperature, $T_{RE}$. At this temperature, which is above room temperature, i.e., above $T_{SE}$, but below $T_C$, the fluid enters the regenerator. In the case where the apparatus is starting up, the fluid leaving the regenerator by line 33 is at about room temperature, but when the cycle is in full operation, the fluid which leaves the regenerator is at a greatly reduced temperature, $T_{RO}$, as seen in Fig. 5.

The additional supply of high-pressure fluid supplied in this step is required to make up the loss in volume in the gas leaving the regenerator due to the cooling of this gas and to its subsequent densification. Thus, this additional supply of high-pressure gas maintains the system at essentially constant pressure.

Moreover, thorough mixing is achieved by introducing the additional supply of fluid which is at room temperature at a point beyond that at which the hot compressed fluid leaves the upper chamber of the cylinder. This is essential to efficient regenerator operation since the introduction of a gas, the temperature of which is consistently decreasing, into a regenerator leads to losses in thermal efficiency.

At the beginning of step 3 (Fig. 3), the intake valve 22 is closed to effect immediate and complete shut-off of incoming high-pressure gas. Simultaneously, valve 28, the exhaust valve connecting the system to the low-pressure reservoir is opened slowly and gradually (Fig. 6) to permit the expanded cooled gas entering the bottom portion of regenerator 30 to enter at essentially constant temperature. This also is essential to the efficient operation of the regenerator.

In step 3, the displacer raised at essentially a constant rate (Fig. 6) during step 2, is caused to dwell in this position for about 110 to 120° of revolution of the displacer cam as illustrated in Fig. 6 which shows its timing sequence.

This, in turn, means that the lower or second chamber 16 is at maximum volume in step 3 and that the cool gas leaving the regenerator enters chamber 16 and is further cooled through expansion. This will be seen in Fig. 5 where the final or coldest temperature is indicated at $T_{CO}$. Valve 28 is fully opened to the low-pressure reservoir by the end of step 3, thus causing the cold expanded gas to flow upward through the regenerator giving up its heat to the extent that it leaves the regenerator at a temperature essentially equivalent to that at which the gas entered.

In step 4 (Fig. 4), the gas is returned by way of the low-pressure reservoir while the displacer is moved downwardly, thus forcing the gas upward through the regenerator where a portion of it enters the upper or first chamber 14 and the remainder flows into the low-pressure reservoir.

Valve 28 remains open throughout this step and is then closed at the end of the step while valve 22 controlling the flow of high-pressure gas is partially opened at the beginning of the cycle (see step 1 above).

During step 4, the displacer is moved downwardly at essentially a constant rate (Fig. 6) thus forcing substantially all of the cold gas from chamber 16 through regenerator 30.

The gas leaving the regenerator, and hence the system, to be recycled is at the temperature $T_{SO}$ (see Fig. 5) which, it will be seen, is essentially equal to that at which it entered the regenerator and above that at which it entered the system. The refrigeration achieved by the cycle may therefore be expressed as $T_{SO}-T_{SE}$. Thus the gas leaving the system is at a temperature higher than the gas entering, which is evidenced by the fact that the return line is actually hot to the touch. The work extracted from the system, i.e., the refrigeration is equivalent to the difference in temperature of the gas in and the gas out of the system.

At the close of step 4, the upper chamber 14 has again achieved maximum volume, contains low-pressure gas and is ready to begin the cycle again.

It will be appreciated that the temperature history diagram of Fig. 5 represents the average temperatures achieved in a cycle of operation. For example, a portion of the expanded fluid will return to the regenerator at a temperature above $T_{CO}$ while another portion will return at a temperature below $T_{CO}$.

It will be seen from the description of the cycle of this invention that in order to achieve efficient operation, it is necessary that in steps 1 and 3 the displacer dwells temporarily at first in its lowest position and then in its highest position to effect a substantially constant flow of gas. Other important aspects of this invention include the supplying of additional high-pressure gas during the step of compression to achieve an essentially constant-pressure operation, the introduction of the additional high-pressure gas at a point and in a manner to maximize regenerator efficiency and a sequence of valve operations to conduct the steps of the cycle as described.

Figs. 7 and 8 and 9 illustrate two modifications of the apparatus which may be used to employ the cycle of this invention.

In Fig. 7 there is shown how the cycle of this invention may be embodied in a refrigeration apparatus comprising a plurality of displacers each operating in a separate cylindrical chamber. The apparatus of Fig. 7 comprises a housing 36 having a tubular head portion 37 and two tubular or cylindrical portions 38 and 39 which are of different diameters but which depend from the common head portion 37. It will be appreciated that although Fig. 7 illustrates the use of two such displacers and corresponding cylindrical portions, the apparatus may embody more than two displacers, the use of three being illustrated in Figs. 10, 11 and 12.

The head portion 37 is closed by a head wall 40 and from a cylindrical head block 42 depend two (or more) displacers 43 and 44 which reciprocate in an up-and-down motion within the corresponding cylindrical portions 38 and 39, respectively. These displacers 43 and 44 are independently secured to the head block 42 by machine screws 45 extending through holes which are slightly larger than the screws. This permits radial adjustment of the displacers and automatic alignment of the displacers in the housing portions 38 and 39.

The head block 42 fits the head portion 37 fairly snugly, thus forming head chamber 46 therein. This head chamber corresponds to the upper or first chamber 14 of Figs. 1–4. Leading into head chamber is main conduit 50. Although the conduits which supply high-pressure fluid and remove low-pressure fluid may communicate directly with head chamber 46, a preferred embodiment is illustrated in Fig. 7. That is, communication with head chamber 46 is achieved through branching conduit 43 which leads into main conduit 50. This arrangement achieves better mixing and hence, as noted above, increased efficiency. In Fig. 7, the high-pressure fluid from a reservoir is introduced through conduit 41, controlled by valve 34 (corresponding to valve 22 of Figs. 1–4) while low-pressure fluid is removed by conduit 42, controlled by valve 35 which in turn corresponds to valve 28 of Figs. 1–4.

The displacers with their respective cylinders form refrigeration chambers 47 and 48, chamber 48 being smaller in volume for any position of the displacers than chamber 47 by virtue of the differences in cylindrical cross-sections. These chambers 47 and 48 correspond to the second or bottom chamber 16 of Figs. 1–4. The refrigeration chambers are isolated from the head chamber 46 by sealing rings 49, which it will be seen later, function at essentially room temperature. Below the sealing rings 49, the displacers 43 and 44 are slightly reduced in diameter to allow a clearance, for example about 0.005 inch from the housing portion 38 and 39. This clearance means that the displacers 43 and 44 are not in thermal contact with the walls of the housing and therefore thermal conduction between the walls of the refrigeration chambers and the displacers is minimized as the displacers move up and down.

Communication between head chamber 46 and the refrigeration chamber 47 and 48 is effected by conduit 50 having branching conduits 51 and 52 into chambers 47 and 48, respectively. Located in the fluid flow path defined by conduit 50 are two thermal storage means 53 and 54 which are conveniently regenerators comprising stacked copper or bronze screening or perforated disks of a high heat capacity metal which permit fluid flow. As will be seen, regenerator 53 is located in the path above branching conduit 51, and regenerator 54 is likewise located between branching conduits 51 and 52. Thus the cold fluid leaving refrigeration chamber 47 passes through regenerator 53 while that leaving refrigeration chamber 48 passes through regenerators 54 and 53.

Suitable means (not shown) for moving the head block 42 are provided and may be connected through a connecting rod.

It will be understood that below the head chamber 46, the housing, conduits and regenerators are enclosed in suitable insulation. Likewise for any apparatus modification, it is preferable to enclose that portion to be maintained at room temperature and below in insulation. A suitable heat exchanger 55 is provided in the branching conduit 52 leading from chamber 48 to permit using the refrigeration generated through heat exchange with a suitable heat transfer fluid entering and leaving by lines 56 and 57, respectively.

The refrigeration method of this invention as performed in a multi-displacer apparatus as illustrated in Fig. 7 may now be described.

In Fig. 7, the displacers 43 and 44 are shown in the position which they would occupy either during step 3 or at the beginning of step 4 (see Figs. 3 and 4). At the beginning of this cycle, i.e., the beginning of step 1, the displacers 43 and 44 are in the down position, valve 34 is open and valve 35 closed. It is assumed in the following description that suitable means for actuating the valves 34 and 35 are provided. For example, the cam means as shown and described in connection with the modification of Fig. 8 may be used. Many types of valves including spool valves and barrel valves are also, of course, suitable for programming the flow of liquid as required by the refrigeration method of this invention.

As intake valve 34 begins to open slowly, the low-pressure gas stored in head chamber 46 at the end of the cycle is compressed by the high-pressure gas supplied by reservoir 60 and entering through conduit 50 and the temperature of the gas in head chamber 46 is raised by compression, as pointed out above in connection with Fig. 5. After the pressure has been built up to the pressure in the high-pressure reservoir 60, the displacers begin to rise and thus begin step 2.

In step 2, the heated gas is displaced from head chamber 46 and as it passes out through line 50 is mixed with an additional quantity of high-pressure gas by virtue of the fact that valve 34 is still open during this second step. The gas is then at a temperature intermediate between the high-pressure gas entering the system and the hot compressed gas leaving head hcamber 46, and it passes by way of conduits 50 through regenerators 53 and 54 wherein heat is stored. In the arrangement of Fig. 7, a portion of the gas enters refrigeration chamber 47, while the remaining portion enters chamber 48. In these chambers the gas expands and cools and that from refrigeration chamber 47 then leaves by way of branching conduit 51, and regenerator 53 while that from refrigeration chamber 48 returns through regenerator 54.

As the displacers move downwardly, the further cooled gas in the refrigeration chambers is displaced through the regenerators to the low-pressure ballast 59 preferably without passing through the head chamber 46, i.e., directly by way of conduit 50.

In passing through the regenerators, the gas cools them although the upper end of regenerator 53 remains close to the temperature of the gas being supplied to the regenerator, a temperature which is between the temperature of the gas after compression in the head chamber and the temperature of the high-pressure supply gas. After the system has been operating and has cooled down, gas flowing into refrigeration chamber 47 will be cooled only by one regenerator 53, whereas gas taken into refrigeration chamber 48 will be cooled by both regenerators 53 and 54, the latter chamber 48 will, after a few cycles drop to a temperature lower than that in chamber 47. This difference will increase until the operating conditions reach equilibrium, that is thermal losses plus refrigeration load equal the cooling effect during each cycle. When equilibrium is reached, a temperature gradient will exist across the regenerators, the upper end of regenerator 53 being above reference or ambient temperature, e.g., about 300° K., and the lower end of regenerator 54 being the lowest, e.g., between 15° and 80° K. if helium is used as a refrigerating fluid.

Where multiple displacers are used such as illustrated in Figs. 7 and 10–12, it may be desirable to modify the regenerators exposed to the lowest temperatures. For example, regenerator 54 of Fig. 7 and regenerator 134 of Figs. 10–12 may be constructed using small lead balls (for example from about .010 to .030 inch in diameter) as filling material, rather than stacked copper or bronze screening which is the preferred regenerator construction for those regenerators maintained at somewhat higher temperatures. Generally, if temperatures lower than 50° K. are to be encountered in the regenerators, the use of lead ball filling will be preferred, due to the high heat capacity of lead in the range of about 15 to 50° K.

It will be seen that by providing a plurality of displacers and cylinders, the cycle of this invention can be made more efficient. The apparatus of Fig. 7 has the added advantage of having the seals 49 at room temperature and the displacers so mounted that they are self-aligning.

In Figs. 8 and 9 yet another modification of apparatus suitable for performing the cycle of this invention is illustrated. The overall cycle of operation of the apparatus of Fig. 8 is that described above for Figs. 1–4 and Fig. 7.

The apparatus of Fig. 8 comprises a cylinder 60 and sliding displacer means 61 comprising three sections 61A, 61B and 61C. The cylinder is closed at the end by walls 62 and 63, the end wall 62 having a packing gland 64 through which a displacer rod 65 reciprocates. The displacer sections are mechanically connected by linear springs 66, located between sections 61A, 61B and 61C and between section 61C and the cylinder end wall 63. When the displacer rod is reciprocated the several sections move concomitantly, that is at overlapping times, and divide the space within the cylinder into a head chamber 67 and expansion chambers 68, 69 and 70.

The total space within the cylinder 60 remains constant, while the parts of the space represented by the head chamber and expansion chambers may vary as the displacer sections move. The relative lengths of the springs, or their stiffness, are selected so that the expansion chambers are progressively larger in the order 70, 69, 68. The springs compress into annular recesses and do not obstruct substantial abutment of the several displacer sections and the cylinder end wall 63.

Extending partly into head chamber 67 are internal splines 71 integral with the cylinder 60 and splines 72 integral with the displacer section 61A. The splines are mated to permit vertical reciprocation of the displacer, and are of a length slightly greater than the stroke of the displacer. When the displacer is in its uppermost position the volume of the head chamber 67 is minimized while allowing fluid passage through the splined region. When the displacer sections are in their lowermost position, the head chamber 67 represents substantially all the volume within the cylinder 60, although a slight clearance may be left in chambers 68, 69 and 70.

The splined portion is shown in cross-section in Fig. 9. It will be appreciated that, although the splining arrangement is conducive to obtaining good heat exchange, it is not essential to the practice of the refrigeration cycle of this invention.

Extending through the displacer sections 61A, 61B and 61C are conduits which form thermal storage means 73, such as regenerators, which interconnect the head chamber 67 and the expansion chambers through passages 96A, 96B and 96C. While the regenerators 73 are for clarity shown as open spaces, it is understood that they contain a thermal storage material occupying most of the volume of the spaces. At one side, the head chamber 67 is provided with ports 74 and 75 which respectively communicate through conduits 76 and 77 (controlled by valves 78 and 79) to a high-pressure ballast 80 and a low-pressure ballast 81. The high-pressure ballast corresponds to reservoir 18 of Fig. 1 and may be any convenient source of working fluid, such as helium gas, under pressure and at room temperature, for example. The low-pressure ballast corresponds to reservoir 24 of Fig. 1 and may be any space or so-called source of low pressure relative to the high-pressure ballast.

As shown in Fig. 8, high and low-pressure sources are provided with a compressor 82 connected from the low-pressure ballast 81 through a cooler 83 and a cleaner 84 to the high-pressure ballast 80, the cooler 83 removing the heat of compression produced by the compressor 82.

As shown in diagrammatic fashion in Fig. 8, a flywheel 85 driven by a motor 86 and connected by any suitable mechanical linkage shown as the dotted line 87 to cams 88 and 89 coordinates reciprocation of the displacer rod 65 and displacer 61 and the cams 88 and 89 which, through linkages 82 and 93 respectively, open and close valves 78 and 79 to achieve the required programmed flow of fluid. While separate valves 78 and 79 are shown it will be obvious that a single valve means can perform the two functions of valves 78 and 79.

Useful refrigeration may be extracted directly from bottom wall 63 but is preferably accomplished by cycling a heat transfer fluid through coils 94 thermally bonded to the bottom portion of cylinder 67 whereby an efficient heat transfer path is provided to transfer heat from the cold fluid in refrigeration chamber 70 to the heat transfer fluid circulating in coils 94.

The operation of the apparatus of Fig. 8 to perform the cycle of this invention may now be reviewed. At the beginning of the cycle, i.e., step 1, the displacer sections are in their lowermost position and remain there throughout step 1. The intake valve 78 is open admitting the fluid under high pressure at normal or ambient temperature to the head chamber 67 to the regenerators 73 and to a minor extent to the expansion chambers 68, 69 and 70. The low-pressure fluid in the head chamber 67 is compressed by incoming compressed fluid and its temperature is raised above the temperature of the fluid supplied from the high-pressure ballast by way of conduit 76 and port 74 (see Fig. 5). By reason of previous cycles performed in the start-up of the apparatus the regenerators and expansion chambers are at progressively lower temperatures, as will be subsequently explained, so that fluid passing through regenerator 73 in displacer section 61A will be cooled to a predetermined amount and fluid further passing through the remaining regenerators will be cooled progressively more and more.

Thus fluid entering expansion chamber 70 will be at a lower temperature than that in chamber 69, etc. However, the head chamber 67, conduits 76 and 77 and the valves 78 and 79 remain at essentially room temperature.

During step 2, i.e., the upward movement of displacer 61, the intake valve 78 remains open thus supplying an additional high-pressure fluid to the system and effectively lowering the temperature of the fluid below that of the compressed fluid but not to the extent that it is cooled to the temperature of the incoming high-pressure fluid. As explained above, this has the effect of maintaining the system at a constant pressure. This in turn means that the fluid forces on the upper and lower faces of the displacer 61 are essentially the same and that very little energy is required to displace the displacer upwardly as it engages in step 2 of the cycle.

As the displacer 61 moves upwardly fluid in the head chamber 67 is displaced downwardly through the regenerators 73 to one or more of the chambers 68 to 70. At first the displacer upper section 61A will be raised, the lower sections 61B and 61C following more or less closely depending upon their spring rates. It may be desirable to open the lowest chamber 70 in advance of opening chambers 69 and 68, in which case the lowest spring 66 would be selected to cause sections 61C and 61B to follow section 61A during the early part of its stroke. By different selections of spring rates, another chamber may be caused to open first, or all three chambers may be caused to open simultaneously. In any case, fluid flows to the expanding chambers 68 to 70, respectively at some part of the upward stroke of step 2, and the fluid is further cooled thereby, the regenerators maintaining a temperature differential between the head chamber 67 and the chamber 68, between chamber 68 and chamber 69, and between chambers 69 and 70. As a result of cooling of the high-pressure fluid in the regenerators and expansion spaces, the fluid further contracts and additional fluid is drawn from the high-pressure ballast. The displacement continues until a very small volume is left in the head chamber 67 and the chambers 68 and 69 represent substantially all of the volume that was initially in the head chamber 67. During the upward stroke the total volume in spaces 67 to 70 remains constant as the head chamber contracts and the lower spaces expand.

At the close of the second step the displacer has reached its uppermost position, the intake valve 78 is rapidly closed and exhaust valve 79 begins to open (see Fig. 6). As in the case of the description of step 3 given in connection with Figs. 1–4 expansion takes place in the chambers 68, 69 and 70 and cooling is achieved. During this step 3 the displacer 61 will, of course, dwell in its bottommost position as shown in Fig. 5.

During its expansion the fluid will flow through regenerators 73 and the head chamber 67 cooling the regenerators until the pressure in all the chambers and the low-pressure ballast is substantially equalized. As the expanding fluid cools the regenerators it is progressively warmed to room temperature.

During step 4, the displacer, following the expansion of the fluid, is driven downwardly displacing the cooled fluid remaining in the chambers 68, 69 and 70 through the regenerators 73 to the head chamber 67, thereby further cooling the regenerators. Since the fluid which originally entered the lower chamber 70 is cooler than that entering the middle chamber 69, and since the fluid leaving chamber 70 absorbs heat in the regenerator of displacer section 61C before cooling the regenerator of displacer section 61B, the regenerators will be at progressively higher temperatures at the end of the four-part cycle described above.

The cycle is repeated continuously until the temperatures of the lowest expansion chamber 70 reaches a value at which insulation is inadequate to prevent net heat loss, and the thermal capacity of the lowest regenerator reaches its limit. In a three-stage apparatus as shown using helium as a refrigerant the lowest expansion chamber will quickly reach a temperature between 10° K. and 20° K., while the other chambers will be at progressively higher temperatures approaching room or reference temperature.

Refrigeration may be extracted from the apparatus by heat exchange with a heat transfer fluid such as helium circulated in coils 94 disposed in thermal conducting relation with the low-temperature chamber 70 or one or more of the other chamber. Other gases such as nitrogen and oxygen may be liquefied by cooling in the coils 94.

An auxiliary heat exchange system may be combined with the refrigeration cycle of this invention which makes it possible to obtain even lower temperatures, i.e., to the point of liquefaction of helium (4.2° K.). Two ways in which this may be done are illustrated in Figs. 10 and 11 wherein like numbers refer to like elements of the apparatus.

Figure 10:
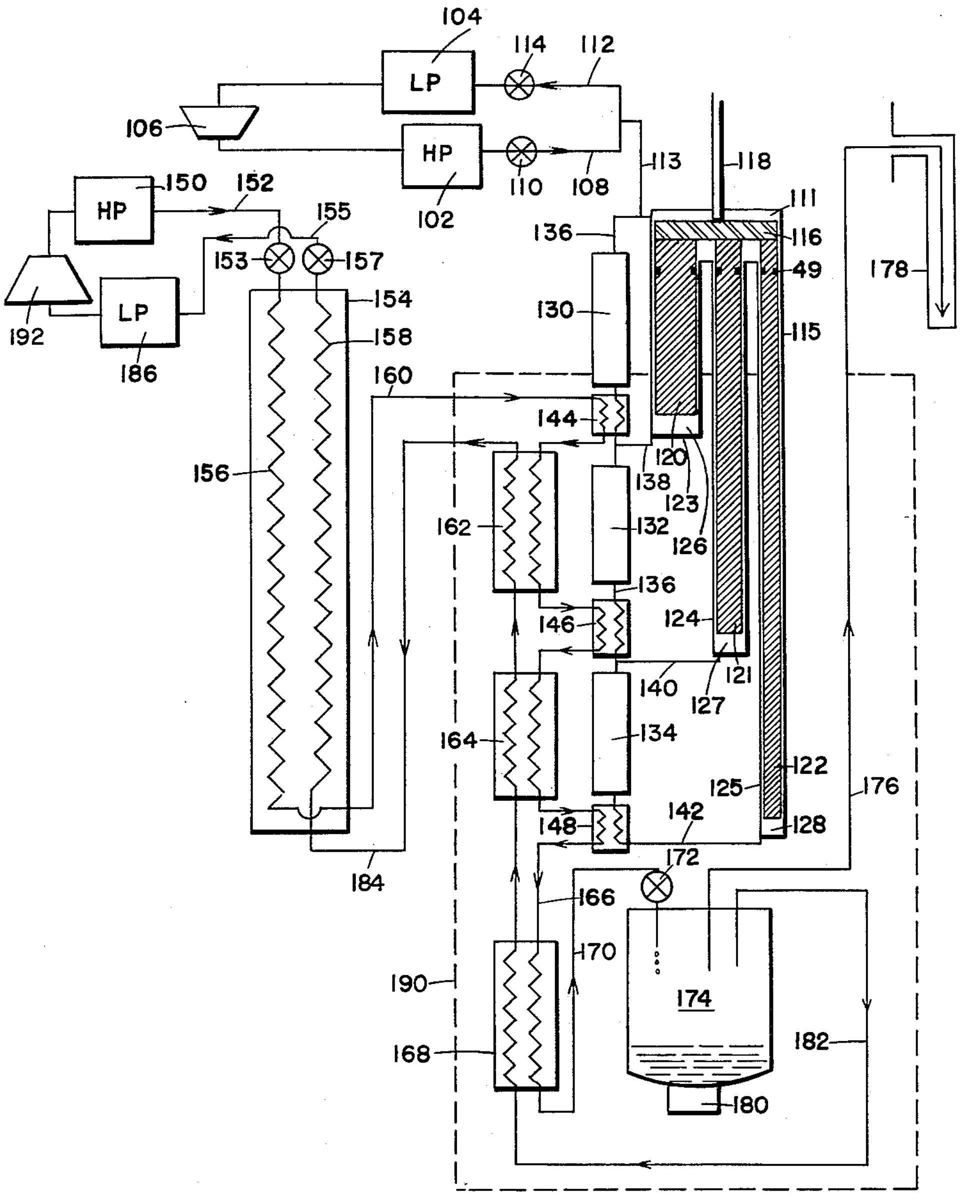
Figs. 10 and 11 illustrate the use of external heat exchangers in conjunction with the modification of Fig. 7.
Figure 11:
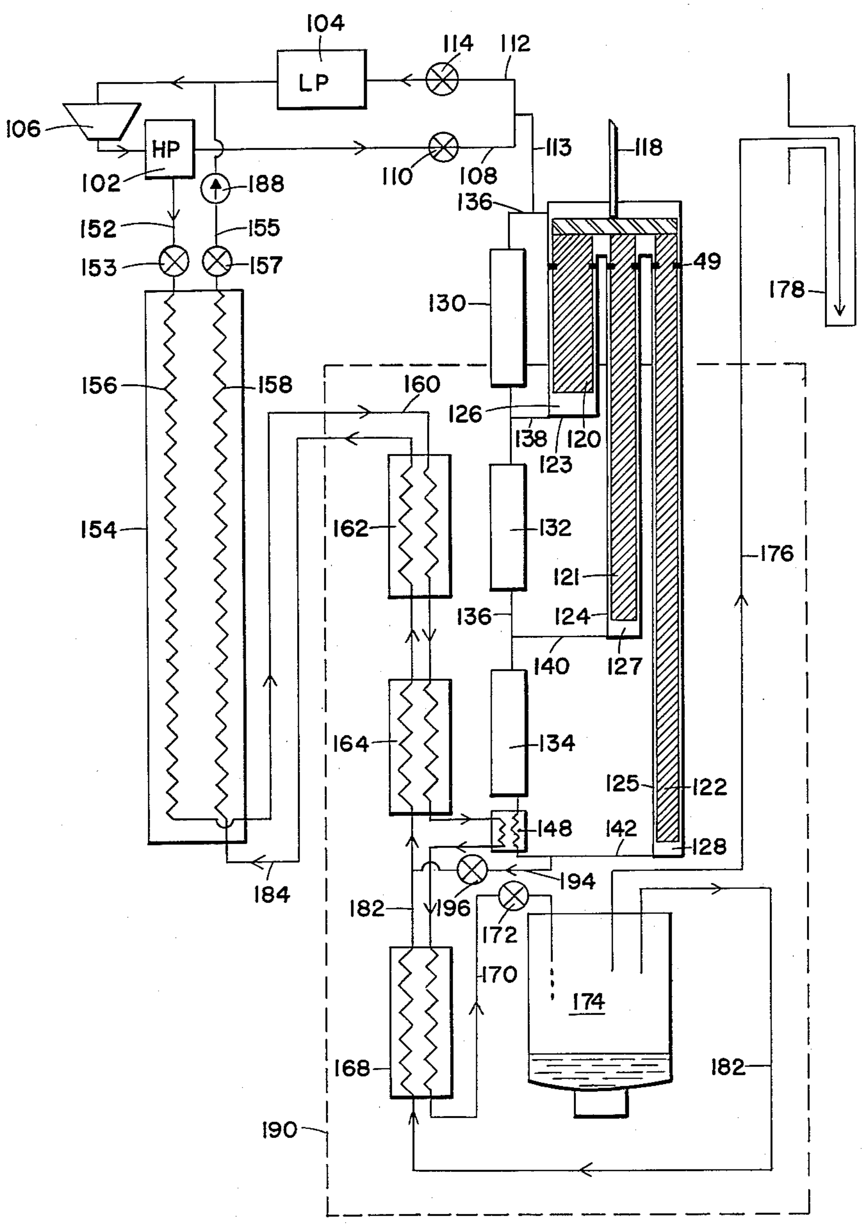

Referring to Fig. 10, it will be seen that the cycle incorporating external heat exchangers is applied to an apparatus such as illustrated in Fig. 7. In the apparatus in Fig. 10, there are provided three parallel displacers, the refrigeration cycle being the same as that described for Fig. 7.

In Fig. 10, which is a diagrammatic representation of the cycle, there are provided a high-pressure reservoir 102 and a low-pressure reservoir 104 between which is located a compressor 106. From high-pressure reservoir 102 conduit 108, controlled by valve 110, supplies high-pressure fluid by way of conduits 113 and 136 to the space 111 in the refrigeration apparatus shown to contain three parallel displacers. Valve 110 corresponds to valve 34 in Fig. 7. Conduit 112, controlled by valve 114 (corresponding to valve 35 of Fig. 7), in turn leads to the low-pressure reservoir 104 and conducts the low-pressure fluid from the refrigeration system. The primary refrigeration apparatus, generally designated as 115, is equipped with a head block 116 from which depend three cylindrical displacers 120, 121 and 122 operating within cylinders 123, 124 and 125, respectively. Vertical movement of the displacers 120, 121 and 122 by means of shaft 118 and a motor (not shown) defines within their respective cylinders refrigeration spaces 126, 127 and 128. This then briefly makes up the apparatus comparable to that illustrated in Fig. 7 along with the three regenerators 130, 132 and 134.

Each of these regenerators is located in a path, to be defined below, so that it may store heat at continuously lower temperatures along the path during supply of high-pressure gas to the refrigeration chambers 126, 127 and 128. The path of the supplying gas under high pressure comprises conduit 136 which provides direct connection among the three regenerators. Leading from conduit 136 below each of the regenerators are branch conduits 138, 140 and 142 connecting conduit 136 with the refrigeration chambers 126, 127 and 128, respectively. Located in conduit 136 above each of the branch conduits are out-of-contact heat exchangers 144, 146 and 148. The other side of the heat exchangers will be described below in connection with the auxiliary heat exchange systems provided.

In addition to the refrigerating fluid employed in the refrigerating cycle of the multiple displacer apparatus 115, there is provided an auxiliary heat exchange system which comprises means by which a heat transfer fluid, for example helium, may be cooled to provide the ultimate refrigeration of the system. The auxiliary heat exchange portion comprises a source of high-pressure heat transfer fluid which may be the same as the high-pressure refrigerating fluid and hence may be derived from the same source 102 used for the refrigerating fluid (Fig. 11) or may be a separate high-pressure heat transfer fluid source 150 when the heat transfer fluid is different from the refrigerating fluid (Fig. 10). In keeping with commonly used cryogenic terminology the fluid circulated in the refrigeration system is referred to as the "refrigerating fluid" while the fluid circulated in the auxiliary heat exchange portion of the apparatus is referred to as the "heat transfer fluid." As will be seen below, these two fluids may be the same or they may be different.

In Fig. 10 there is provided a system which permits the use of a heat transfer fluid which is different from the refrigerating fluid circulated in the refrigerating cycle. This arrangement provides a separate high-pressure fluid reservoir 150, a separate low-pressure reservoir 186 and compressor 192. Fluid from high-pressure reservoir 150 is conducted by conduit 152, controlled by valve 153, while fluid entering low-pressure reservoir does so by conduit 155, controlled by valve 157.

The high-pressure heat transfer fluid, from whatever source, enters first a main heat exchanger 154 by way of a suitably-valved conduit such as 152. Main heat exchanger 154 provides for out-of-contact heat exchange such as by finned tubing 156 around which is a channel 158 (for convenience of illustration on these are indicated in Figs. 10 and 11 in conventional fashion). It is, however, within the scope of this invention that either the high-pressure fluid or low-pressure fluid may pass through a finned tubing while the other is circulated around the tubing. Any other suitable out-of-contact heat exchanger may, of course, also be used. The heat transfer fluid leaving heat exchanger 154 by way of conduit 160 has been cooled by out-of-contact heat exchange with cold low-pressure gas as will be apparent in the following description.

The cooling of the high-pressure heat transfer fluid is further accomplished in heat exchanger 144 through refrigeration delivered by the cold gas leaving and entering regenerator 130. Likewise cooling is further accomplished in heat exchanger 162, in heat exchanger 146 by cold gas leaving and entering regenerator 132, in heat exchanger 164 and in heat exchanger 148 by cold gas leaving and entering regenerator 134. The heat transfer fluid which leaves heat exchanger 148 by conduit 166 is finally passed through an out-of-contact heat exchanger 168 and from there by means of conduit 170 it is directed into an expansion valve, for example a Joule-Thomson valve 172, where it is expanded and in the process of expansion further cooled and may be liquefied in a collecting column 174. A portion of the finally cooled or liquefield heat transfer fluid from collecting column 174 may be removed from the system by means of conduit 176 into any suitable storage vessel 178. The remaining liquefied heat transfer fluid in collecting vessel 174 is boiled off (with the use of a heater 180 if necessary), and the cold gas conducted by conduit 182 out of liquid storage vessel 174 through the cycle in reverse order by which the high-pressure heat transfer fluid entered. Thus, the low-pressure cold heat transfer fluid, e.g., helium, passes from conduit 182 into heat exchanger 168, 164 and 162 cooling the incoming high-pressure heat transfer fluid, described above. Finally, the low-pressure heat transfer fluid leaving this system passes by conduit 184 and the heat exchanger 154 to enter low-pressure reservoir 186.

Suitable valves are supplied, and that portion of the system enclosed by the dotted line 190 is insulated by any suitable means which may include the use of radiation shields.

Fig. 11 illustrates a modification of the incorporation of an auxiliary heat exchange system. The modification of Fig. 11 shows first how the same fluid may be used for the heat transfer fluid as that used as the refrigerating liquid passing through the refrigerating system. For example, helium may be used in both capacities. In this modification the high-pressure reservoir 150, low-pressure reservoir 104 and compressor 106 may serve both fluids.

The second modification illustrated in Fig. 11 embodies the elimination of the heat exchangers 144 and 146 of Fig. 10 and the addition of bleed-off line 194, controlled by valve 196 and communicating between refrigeration chamber 128 and return line 182, whereby cold fluid may be introduced into the return stream to compensate for any liquefied heat transfer fluid removed from vessel 174 and hence to balance the heat exchange in the system.

In the operation of the refrigeration system of Fig. 11, the flow of high-pressure fluid from high-pressure reservoir 102 through heat exchanger 154 is accomplished as in Fig. 10. The elimination of heat exchangers 144 and 146 of Fig. 10 means that the high-pressure fluid passes directly through heat exchangers 162 and 164. However, it has been found convenient to retain heat exchanger 148 to further cool the high-pressure heat transfer fluid by out-of-contact heat exchange with the coldest portion of the refrigerating fluid as it leaves refrigerating chamber 128. Further cooling in heat exchanger 168, expansion and liquefaction in a Joule-Thomson valve 172 and collection of the liquid in vessel 174 is accomplished in the same manner as that described in connection with Fig. 10.

In the arrangement of Fig. 11, there is provided method and means whereby a portion of the coldest refrigerating fluid may be introduced into the return portion of the heat exchange cycle to compensate for heat losses and for any heat transfer fluid which may have been removed by way of line 176. This is done by providing bleed-off line 194, controlled by a one-way valve 196 which permits the flow of cold refrigerating fluid into return line 182 and hence provides additional cooling of the incoming high-pressure heat transfer fluid.

Finally, in Fig. 11, there is provided a one-way valve 188 which permits the low-pressure heat transfer fluid to re-enter the cycle but preventss any back pressure in the low-pressure side of heat exchanger 154.

In either of these modifications, using an auxiliary heat exchange system (or in modifications equivalent to those illustrated in Figs. 10 and 11), it is possible to attain temperatures lower than those attainable by the refrigeration system alone. In apparatus such as illustrated in Figs. 10 and 11, helium has been successfully liquefied. This, of course, means that by the proper choice of refrigerating fluid and heat transfer fluid, any of the low-boiling gases can be liquefied.

Figs. 12–17 illustrate modifications designed to improve the efficiency of the method and apparatus of this invention. These modifications include the incorporation of what may be termed "heat stations," the use of one-way check valves to achieve the most efficient direction of flow of fluid, and the partial lining of the colder portions of the displacer wall and of the inside cylinder wall with a material having a high heat capacity at the low temperatures encountered. The use of heat stations is illustrated in Figs. 12–15, of the one-way valves in Fig. 15, and of the partial lining of displacer walls and cylinders in Figs. 16 and 17. In these figures, like numbers refer to like elements in Figs. 10 and 11.

Figures 12, 13, 14:
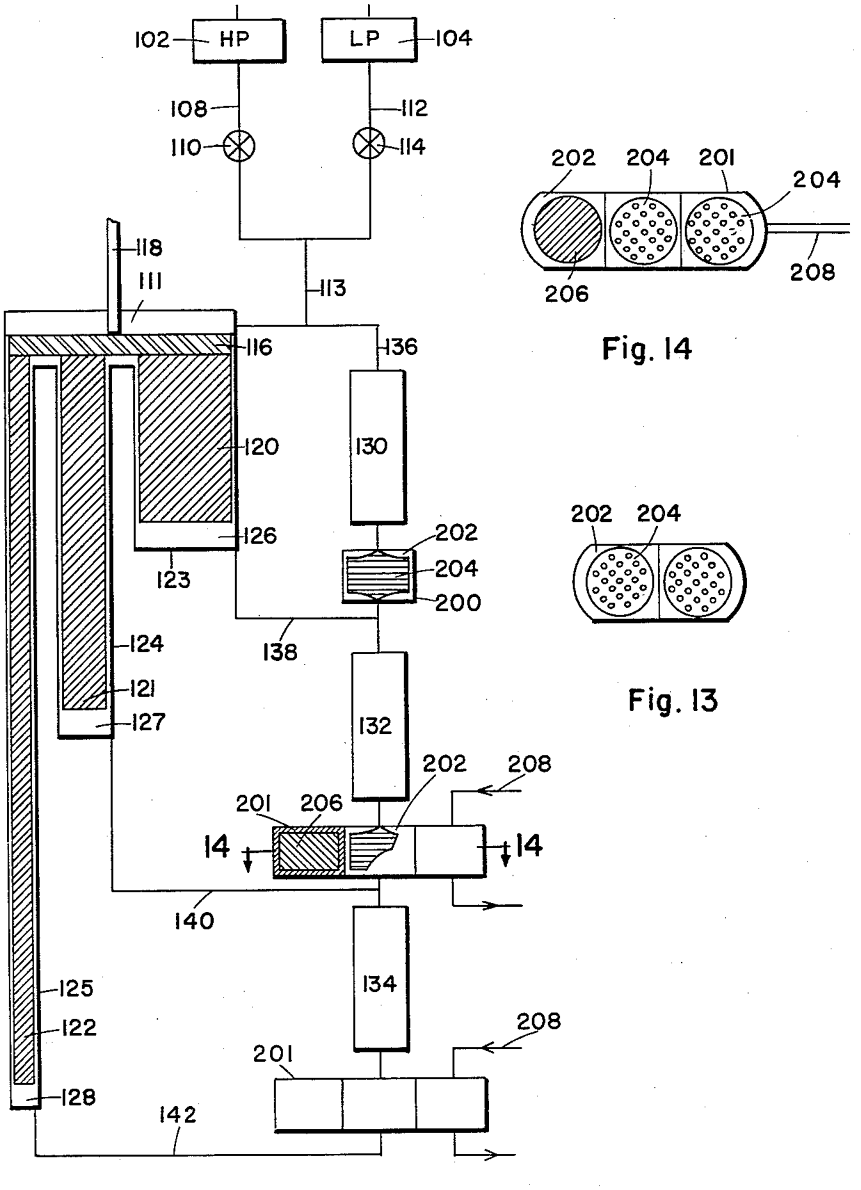
Fig. 12 illustrates the use of heat stations in conjunction with the apparatus of Fig. 7.
Fig. 13 is a cross-sectional view of one modification of a heat station taken along lines 13—13 of Fig. 15.
Fig. 14 is a cross-sectional view of another modification of a heat station taken along lines 14—14 of Fig. 12.

Turning now to Fig. 12, there is shown a heat station 200 located in the flow path and interposed between regenerator 130 and branching conduit 138. The purpose of the heat station is to stabilize the regenerator by reducing the fluctuations in temperature of the fluid delivered to the top of the next succeeding regenerator 132 and of the fluid returned through the regenerator from the refrigeration chambers. The minimizing of these temperature fluctuations materially improves the efficiencies of the regenerators by establishing and maintaining a true temperature gradient in them. Achieving high regenerator efficiencies is particularly important in apparatus which is relatively small, such as the apparatus of this invention may be if desired.

The heat stations may take the forms illustrated in Figs. 12, 13, 14 and 15. That is, they may consist of one or more sections. The simplest form is heat station 200 of Fig. 12 which is a single section formed as a regenerator maintained at essentially constant temperature throughout. This is achieved by constructing the heat station section of a metal or metals having high heat capacities at low temperatures (e.g., below about 50° K.). The section consists of a fluid passage made up of a stack of perforated disks spaced apart and thermally bonded to the housing surrounding them. A preferred embodiment is that illustrated in Figs. 12 and 13. An aluminum or copper block 202 containing stacked punched copper plates 204 (having holes from about .010 to about .050 inch in diameter) thermally bonded through soldering provides a section. Several of these sections may, in turn, be thermally bonded as shown in Fig. 13, and as heat station 203 in Fig. 15. The section adjacent that section through which the working refrigeration fluid is passed may be equipped with a conduit 208 for conducting a heat transfer fluid through the section to extract refrigeration from the system.

Another type of heat station adapted to function between the regenerators associated with the colder refrigeration chambers is illustrated as heat station 201 in Figs. 12 and 14. In these stations one section serves as a thermal storage area and may conveniently be a solid body 206 of a metal, such as lead, thermally bonded to the heat station block which, in turn, is thermally bonded to another heat station section. For example, in Fig. 12, a typical cycle using helium as the refrigerating fluid in the system, the temperature of the fluid leaving or entering the lower end of regenerator 132 may be about 35° K., while that leaving or entering the lower end of regenerator 134 may be about 15° K. The lead block 206 in the heat station having a high heat capacity at these temperatures rapidly reaches these temperatures and serves to stabilize the temperature of the fluid passing through the heat stations by virtue of the heat transfer path maintained from the solid lead block to the stacked disks 204.

Figure 15:
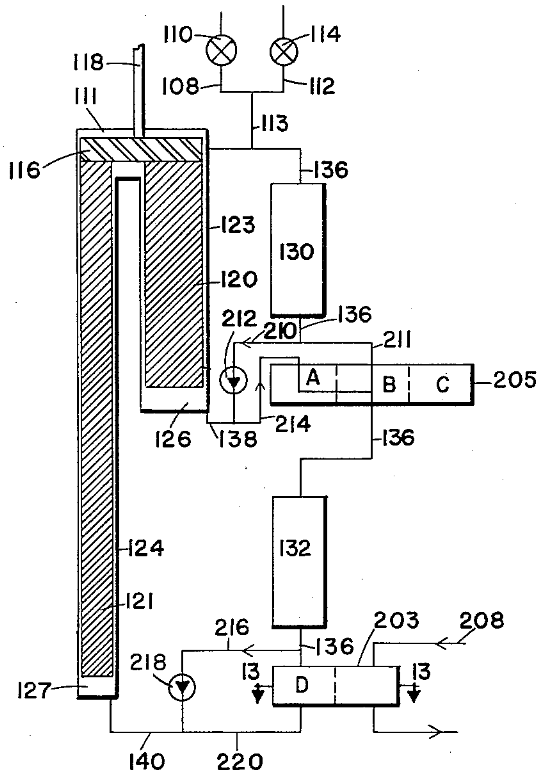
Fig. 15 is a modification of the apparatus of Fig. 12.

The efficiency of the regenerators may be further improved by controlling the direction of flow through the heat stations. Two ways in which this may be done by means of one-way check valves are illustrated in Fig. 15. The heat station 205 is here shown to be made up of three sections, two of which, i.e. A and B, handle the flow of the refrigeration fluid, the third, C, providing means for extracting refrigeration if desired by use of an externally supplied heat transfer fluid. The fluid leaving regenerator 130 by way of conduit 136 is divided, a first portion going directly to refrigeration chamber 126 by way of conduit 210 and one-way valve 212, a second portion going to regenerator 132 by way of conduit 211, heat station section B and main conduit 136. The colder expanded fluid leaving refrigeration chamber 126, is forced to return into the main conduit 136 by way of conduit 214 into section A and thus to stabilize the temperature in section A and likewise in section B because of the thermal contact therebetween. Thus, that portion of the fluid entering regenerator 132 has not only been stabilized with respect to temperature but has been cooled to essentially the same temperature as the fluid leaving refrigeration chamber 126.

Likewise the fluid leaving regenerator 132 may enter refrigeration chamber 127 by way of conduit 216, one-way valve 218 and branching conduit 140 and also by way of section D of the heat station 203, conduit 220 and branching conduit 140. However, the refrigeration fluid must return through the path leading through the heat station thus stabilizing the temperature of the fluid returning through regenerator 132. This in turn means that the fluid of the next cycle leaving the lower end of regenerator 132 is near the lowest temperature possible.

Figure 16:
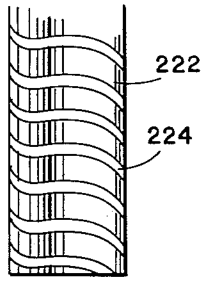
Fig. 16 illustrates a modification of the lower portion of a displacer.
Figure 17:
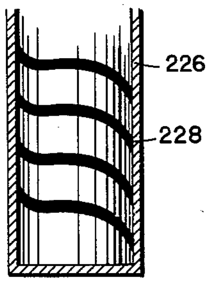
Fig. 17 illustrates a modification of the lower portion of the inside cylinder wall.

Finally, Figs. 16 and 17 show an additional modification which may be made to the displacer walls and cylinder walls to impart better thermal properties to those portions of the displacers and cylinders which are to be maintained at very low temperatures, e.g., below about 50° K.

From practical and thermodynamic considerations, the displacers which are maintained at room temperatures at the top end and at low temperatures at the bottom end, and which should preferably transfer a minimum quantity of heat from end to end, are constructed from materials which are easily formed into the desired shape, which have a minimum coefficient of thermal expansion, and which have a very low heat capacity over the range of temperatures to which they are to be exposed. A preferred material for displacer construction has been found in a dense, resin-impregnated fibrous material, commonly called Micarta.

The displacer fits loosely in the cylinder and is sealed at the top. Thus when fluid pressure is increased and decreased fluid flows in and out of the space between the displacer and the cylinder. In general this space is small relative to the expansion volume but may, in small units, be nearly as large. The fluid flowing up and down in this space would transfer heat away from the lower colder regions and decrease the efficiency of the refrigeration system if it were not for the regenerative effect of the cylinder walls and displacer surface. In flowing up through this space the fluid is heated by cooling the surfaces of displacer and cylinder. In flowing down through this space the fluid is recooled by heating the surfaces, such that when the fluid reenters the expansion space it is very near the expansion space temperature.

This effect cannot occur if the cylinder walls and displacer do not have significant heat capacities. Below about 50° K. the normal materials of construction of the cylinder (stainless steel for example) and of the displacer (Micarta for example) have very little heat capacity. To increase the heat capacities to a lower temperature the displacer or cylinder or both are embedded with rings or helices of lead as shown in Figs. 16 and 17, as lead has heat capacity to a lower temperature. This modification is only necessary if refrigeration is to be used to a temperature lower than about 50° K. This may be conveniently accomplished by embedding in the outer surface of the displacer 222, rings or helical windings or strips 224 of lead as shown in Fig. 16. The lead is so inserted or embedded that its surface is flush with that of the displacer so as to give a smooth overall displacer surface. Likewise, the surface of the inside of the cylinder 226 (Fig. 17) may be embedded with rings or helical winding 228. Generally, it will be preferable to modify that portion of the displacers and cylinders which extend beyond the length of the shortest cylinder in a multiple-cylinder apparatus such as shown in Figs. 12 and 15.

From the above description of this invention it will be seen that there is provided a novel refrigeration method and apparatus for carrying out the cycle of this method in an efficient manner. With the incorporation of a heat exchange system, this invention affords a simple, efficient way to liquefy helium, and hence to liquefy all of the low-boiling gases.

The apparatus of this invention is equally adaptable to one-stage and multistage operation. The present invention is not limited to the apparatus shown for the purpose of illustration, but comprises all modifications and equivalents falling within the scope of the appended claims.

I claim:

1. The fluid refrigeration method which comprises supplying an initial quantity of refrigeration fluid at a given temperature and under high pressure along a path to an enclosed space, removing and storing heat from the fluid during supply along said path thereby initially cooling the fluid, continuing supply of high-pressure fluid throughout said initial cooling thereby to maintain said high pressure by addition of fluid until a final quantity of cooled fluid under said high pressure is supplied to said space, discontinuing supply of high-pressure fluid, effecting expansion of said final quantity of fluid by delivery of heat energy external of said space thereby further to cool and extract energy from the fluid in said space, and exhausting the further cooled fluid from said space through said path, the further cooled fluid receiving heat previously stored along said path and leaving said path at a temperature above that at which it was supplied whereby more heat is taken out than was brought in by said supply.

2. The fluid refrigeration method which comprises supplying an initial quantity of refrigeration fluid at a given temperature and under high pressure along a path to an enclosed space, removing and storing heat from the fluid during supply along said path thereby initially cooling the fluid, continuing supply of high-pressure fluid throughout said initial cooling thereby to maintain said high pressure by addition of fluid until a final quantity of cooled fluid under said high pressure is supplied to said space, discontinuing supply of high-pressure fluid, effecting expansion of said final quantity of fluid by delivery of heat energy external of said space thereby further to cool and extract energy from the fluid in said space, and exhausting the further cooled fluid from said space through said path, the further cooled fluid delivering refrigeration to a thermal load in said path, then receiving heat previously stored along said path and leaving said path at a temperature above that at which it was supplied whereby more heat is taken out than was brought in by said supply.

3. The fluid refrigeration method which comprises supplying an initial quantity of refrigeration fluid at a given temperature and under high pressure along a path to an enclosed space, removing and storing heat from the fluid during supply along said path thereby initially cooling the fluid, the heat being stored at continually lower temperatures along the path, continuing supply of high-pressure fluid throughout said initial cooling thereby to maintain said high pressure by addition of fluid until a final quantity of cooled fluid under said high pressure is supplied to said space, dincontinuing supply of high-pressure fluid, effecting expansion of said final quantity of fluid by delivery of heat energy external of said space thereby further to cool and extract energy from the fluid in said space, and exhausting the further cooled fluid from said space through said path, the further cooled fluid receiving heat previously stored along said path and leaving said path at a temperature above that at which it was supplied whereby more heat it taken out than was brought in by said supply.

4. The fluid refrigeration method which comprises supplying an initial quantity of a high-pressure refrigeration fluid to a first enclosed space thereby increasing the fluid pressure therein and heating said initial quantity of fluid, mixing the resulting heated initial quantity of fluid with an additional quantity of said high-pressure refrigerating fluid to form a fluid mixture at a temperature intermediate between that of said heated initial quantity and said additional quantity, supplying said fluid mixture to a second enclosed space, removing and storing heat from said fluid mixture along a path during said supply to said second enclosed space thereby initially cooling the fluid, continuing supply of said fluid mixture throughout said initial cooling thereby to maintain said high pressure by addition of fluid until a final quantity of cooled fluid under said high pressure is supplied to said second enclosed space, discontinuing supply of high-pressure fluid, effecting expansion of said final quantity of fluid in said second enclosed space thereby further to cool and extract energy from the fluid in said second enclosed space, and exhausting the further cooled fluid from said second enclosed space through said path, the further cooled fluid receiving heat previously stored along said path and leaving said path at a temperature very close to the temperature of said fluid mixture and above that of said initial quantity of said fluid whereby more heat is taken out than was brought in by said initial and additional quantities of fluid.

5. The fluid refrigeration method which comprises supplying an initial quantity of refrigeration fluid at a given temperature and under high pressure along a path to a succession of enclosed spaces, each succeeding space being adapted to receive a portion of said fluid and to be maintained at a temperature lower than the preceding one, removing and storing heat from said fluid during supply along said path thereby initially cooling that portion of said fluid entering each of said enclosed spaces, continuing supply of high-pressure fluid throughout said initial cooling thereby to maintain said high pressure by addition of fluid until a final quantity of cooled fluid under said high pressure is supplied to said enclosed spaces, discontinuing supply of high-pressure fluid, effecting expansion of said final quantity of fluid in each of said enclosed spaces by delivery of heat energy external of said spaces thereby further to cool and extract energy from said fluid in said spaces, and exhausting the further cooled fluid from said spaces through said path, the further cooled fluid receiving heat previously stored along said path and leaving said path at a temperature above that at which it was supplied whereby more heat is taken out than was brought in by said supply.

6. The fluid refrigeration method which comprises supplying an initial quantity of refrigeration fluid at a given temperature and under high pressure along a path to a succession of enclosed spaces, each succeeding space being adapted to receive a portion of said fluid and to be maintained at a temperature lower than the preceding one, removing and storing heat from said fluid during supply along said path thereby initially cooling that portion of said fluid entering each of said enclosed spaces, continuing supply of high-pressure fluid throughout said initial cooling thereby to maintain said high pressure by addition of fluid until a final quantity of cooled fluid under said high pressure is supplied to said enclosed spaces, dincontinuing supply of high-pressure fluid, effecting expansion of said final quantity of fluid in each of said enclosed spaces by delivery of heat energy external of said spaces thereby further to cool and extract energy from said fluid in said spaces, and exhausting the further cooled fluid from each of said spaces through said path, the further cooled fluid delivering refrigeration to a thermal load in said path, then receiving heat previously stored along said path and leaving said path at a temperature above that at which it was supplied whereby more heat is taken out than was brought in by said supply.

7. The fluid refrigeration method which comprises supplying an initial quantity of refrigeration fluid at a given temperature and under high pressure along a path to a succession of enclosed spaces, each succeeding space being adapted to receive a portion of said fluid and to be maintained at a temperature lower than the preceding one, removing and storing heat from said fluid during supply along said path thereby initially cooling that portion of said fluid entering each of said enclosed spaces, the heat being stored at continually lower temperatures along said path, continuing supply of high-pressure fluid throughout said initial cooling thereby to maintain said high pressure by addition of fluid until a final quantity of cooled fluid under said high pressure is supplied to said enclosed spaces, discontinuing supply of high-pressure fluid, effecting expansion of said final quantity of fluid in each of said enclosed spaces by delivery of heat energy external of said spaces thereby further to cool and extract energy from said fluid in said spaces, and exhausting the further cooled fluid from each of said spaces through said path, the further cooled fluid delivering refrigeration to a thermal load in said path, then receiving heat previously stored along said path and leaving said path at a temperature above that at which it was supplied whereby more heat is taken out than was brought in by said supply.

8. Method in accordance with claim 7 including the step of contacting said fluid with an essentially constant-temperature surface along said flow path whereby said removing and storing heat may be more efficiently accomplished.

9. Method in accordance with claim 7 including the steps of contacting a portion of said fluid entering said enclosed spaces with an essentially constant temperature surface along said flow path and contacting all of said fluid exhausted from said enclosed spaces with said surface whereby said removing and storing heat may be more efficiently accomplished.

10. The fluid refrigeration method which comprises supplying an initial quantity of a high-pressure refrigerating fluid to a first enclosed space thereby increasing the fluid pressure therein and heating said initial quantity of fluid, mixing the resulting heated initial quantity of fluid with an additional quantity of said high-pressure refrigerating fluid to form a fluid mixture at a temperature intermediate between that of said heated initial quantity and said additional quantity, supplying said fluid mixture to a succession of laterally spaced enclosure, each succeeding enclosure being adapted to receive a portion of said fluid and to be maintained at a temperature lower than the preceding one, removing and storing heat from said fluid mixture along a path during said supply to said enclosures thereby initially cooling the fluid, continuing supply of said fluid mixture throughout said initial cooling thereby to maintain said high pressure by addition of fluid until a final quantity of cooled fluid under said high pressure is supplied to said enclosures, discontinuing supply of high-pressure fluid, effecting expansion of said final quantity of fluid in said enclosures thereby further to cool and extract energy from the fluid in said enclosures, and exhausting the further cooled fluid from said enclosures through said path, the further cooled fluid receiving heat previously stored along said path and leaving said path at a temperature very close to the temperature of said fluid mixture and above that of said initial quantity of said fluid whereby more heat is taken out than was brought in by said initial and said additional quantities of fluid.

11. The fluid refrigeration method comprising the steps of supplying to a refrigerating system an initial quantity of refrigerating fluid at a given temperature and under high pressure along a path to a succession of enclosed spaces, each succeeding space being adapted to receive a portion of said refrigerating fluid and to be maintained at a temperature lower than the preceding one, removing and storing heat from said refrigerating fluid during supply along said path thereby initially cooling that portion of said said refrigerating fluid entering each of said enclosed spaces, continuing supply of high-pressure refrigerating fluid throughout said initial cooling thereby to maintain said high pressure by addition of refrigerating fluid until a final quantity of cooled refrigerating fluid under said high pressure is supplied to said enclosed spaces, discontinuing supply of high-pressure refrigerating fluid, effecting expansion of said final quantity of refrigerating fluid in each of said enclosed spaces by delivery of heat energy external of said space thereby further to cool and extract energy from said refrigerating fluid in said spaces, and exhausting the further cooled refrigerating fluid from each of said spaces through said path; introducing into a heat transfer system high-pressure heat transfer fluid, progressively cooling said high-pressure transfer fluid by out-of-contact heat exchange with at least a portion of said refrigerating fluid in said refrigerating system, expanding said high-pressure heat transfer fluid to further cool it, and recycling at least a portion of the resulting further-cooled low-pressure heat transfer fluid in out-of-contact heat exchange with said high-pressure heat transfer fluid introduced into said heat transfer system.

12. The fluid refrigeration method comprising the steps of supplying to a refrigerator system an initial quantity of refrigerating fluid at a given temperature and under high pressure along a path to a succession of enclosed spaces, each succeeding space being adapted to receive a portion of said refrigerating fluid and to be maintained at a temperature lower than the preceding one, removing and storing heat from said refrigerating fluid during supply along said paths thereby initially cooling that portion of said refrigerating fluid entering each of said enclosed spaces, continuing supply of high-pressure refrigerating fluid throughout said initial cooling thereby to maintain said high pressure by addition of refrigerating fluid until a final quantity of cooled refrigerating fluid under said high pressure is supplied to said enclosed spaces, discontinuing supply of high-pressure refrigerating fluid, effecting expansion of said final quantity of refrigerating fluid in each of said enclosed spaces by delivery of heat energy external of said spaces thereby further to cool and extract energy from said refrigerating fluid in said spaces, and exhausting the further cooled refrigerating fluid from each of said spaces through said path; introducing into a heat transfer system high-pressure heat transfer fluid, progressively cooling said high-pressure heat transfer fluid by out-of-contact heat exchange with at least a portion of said refrigerating fluid in said refrigerating system, expanding said high-pressure heat transfer fluid to liquefy it, removing a portion of the liquefied heat transfer fluid, and recycling the remaining portion of said heat transfer fluid in out-of-contact heat exchange with said high-pressure heat transfer fluid introduced into said heat transfer system.

13. Method in accordance with claim 12 including the step of transferring a portion of said refrigerating fluid exhausted from said enclosed spaces of said refrigerating system into said further-cooled low-pressure heat transfer fluid of said heat transfer system thereby compensating for losses in volume of said heat transfer fluid.

14. The fluid refrigeration method which comprises the steps of supplying an initial quantity of a high-pressure refrigerating fluid to a first enclosed space thereby increasing the fluid pressure therein and heating said initial quantity of fluid, mixing the resulting heated initial quantity of fluid with an additional quantity of said high-pressure refrigerating fluid to form a fluid mixture at a temperature intermediate between that of said heated initial quantity and said additional quantity, supplying said fluid mixture to a succession of laterally spaced enclosures each succeeding enclosure being adapted to receive a portion of said fluid and to be maintained at a temperature lower than the preceding one, removing and storing heat from said fluid mixture along a path during said supply to said enclosures thereby initially cooling the fluid, continuing supply of said fluid mixture throughout said initial cooling thereby to maintain said high pressure by addition of fluid until a final quantity of cooled fluid under said high pressure is supplied to said enclosures, discontinuing supply of high-pressure fluid, effecting expansion of said final quantity of fluid in said enclosures thereby further to cool and extract energy from the fluid in said enclosures, and exhausting the further cooled fluid from said enclosures through said path; introducing into a heat transfer system high-pressure heat transfer fluid, progressively cooling said high-pressure heat transfer fluid by out-of-contact heat exchange with at least a portion of said refrigerating fluid in said refrigerating system, expanding said high-pressure heat transfer fluid to further cool it, and recycling at least a portion of the resulting further-cooled low-pressure heat transfer fluid in out-of-contact heat exchange with said high-pressure heat transfer fluid introduced into said heat transfer system.

15. Refrigeration apparatus comprising cylinder means, displacer means movable within said cylinder means, first and second chambers the volumes of which are defined by the movement of said displacer means; conduit means connecting said first and second chambers, thermal storage means associated with said conduit means; means for imparting predetermined motion to said displacer means, the displacer motion being defined in four steps and consisting of dwelling in an uppermost position, moving downwardly, dwelling in a lowermost position and moving upwardly, respectively; supply reservoir means for supplying high-pressure fluid, exhaust reservoir means for receiving low-pressure fluid, valve means associated with said supply and exhaust reservoir means and controlled to cause high-pressure fluid to enter said first chamber and said conduit during said first and second steps of said displacer motion and to exhaust low-pressure fluid during said third and fourth steps of said displacer motion.

16. Refrigeration apparatus in accordance with claim 15 further characterized by having heat exchange means associated with said conduit thereby to extract refrigeration by means of a heat transfer fluid.

17. Refrigeration apparatus in accordance with claim 15 including insulation means surrounding at least that portion of said apparatus maintained at temperatures below ambient temperature during operation.

18. Refrigeration apparatus comprising a plurality of cylinder means depending from a common cylinder head, displacer means movable within each of said cylinder means and depending from a common head plate, a head chamber defined by said cylinder head and said head plate, a plurality of refrigeration chambers defined by the bottoms of said displacer means and their respective cylinder means and variable in volume with the movement of said displacer means, conduit means connecting said head chamber with said refrigeration chambers, a plurality of thermal storage means associated with said conduit means, means for imparting predetermined motion to said head plate and thereby to said displacer means; valve means connected to said conduit means for admitting compressed fluid to and releasing fluid from said chambers, and control means coordinating said displacer means and said valve means to supply a quantity of compressed fluid to said conduit means while said displacer means causes said chambers to expand, said control means being timed thereafter to cause said displacer means and valve means to release pressure on the quantity of fluid in said refrigeration chambers thereby to effect expansion and cooling of said quantity of fluid.

19. Apparatus in accordance with claim 18 wherein said thermal storage means are constructed of metals having high heat capacities over the temperature range encountered in said storage means.

20. Apparatus in accordance with claim 18 wherein the coldest thermal storage means comprises small lead balls as said storage means.

21. Refrigeration apparatus comprising a plurality of cylinder means depending from a common cylinder head, displacer means movable within each of said cylinder means and depending from a common head plate, a head chamber defined by said cylinder head and said head plate, a plurality of refrigeration chambers defined by the bottom of said displacer means and their respective cylinder means and variable in volume with the movement of said displacer means, conduit means connecting said head chamber with said refrigeration chamber thereby to form a fluid flow path, a plurality of thermal storage means located in said fluid flow path, means for imparting predetermined motion to said head plate and thereby to said displacer means, valve means connected to said conduit means for admitting compressed fluid to and releasing fluid from said chambers, control means coordinating said displacer means and said valve means to supply a quantity of compressed fluid to said conduit mens while said displacer means causes said chambers to expand, said control means being timed thereafter to cause said displacer means and valve means to release pressure on the quantity of fluid in said refrigeration chambers thereby to effect expansion and cooling of said quantity of fluid, and thermal heat station means located in said fluid flow path and associated with respective thermal storage means, whereby fluctuations in the temperature of fluid entering and leaving said thermal storage means are minimized.

22. Apparatus in accordance with claim 21 further characterized by having means for circulating a heat transfer fluid through a section of said heat station means in out-of-contact heat exchange with said fluid.

23. Apparatus in accordance with claim 21 including insulation means surrounding at least that portion of said apparatus maintained at temperatures below ambient temperature during operation.

24. In a refrigeration apparatus comprising a plurality of refrigeration chambers, conduit means connecting said refrigeration chambers thereby to form a fluid flow path, and thermal storage means located in said fluid flow path, heat station means associated with said thermal storage means thereby to minimize temperature fluctuations in fluid entering and leaving said thermal storage means, said heat station means comprising a block and a passage therethrough, said passage being located in said flow path and containing stacked perforated disks thermally bonded to said block, said block and said disks being of metals having high heat capacities at low temperatures.

25. In a refrigeration apparatus comprising a plurality of refrigeration chambers, conduit means connecting said refrigeration chambers thereby to form a fluid flow path, and thermal storage means located in said fluid flow path, heat station means associated with said thermal storage means thereby to minimize temperature fluctuations in fluid entering and leaving said thermal storage means, said heat station means comprising a plurality of thermally bonded blocks, at least one of which has a passage therethrough, said passage containing stacked perforated disks thermally bonded to said block, said heat station means being constructed of metals having high heat capacities at low temperatures.

26. In a refrigeration apparatus comprising a plurality of refrigeration chambers, conduit means connecting said refrigeration chambers thereby to form a fluid flow path whereby high-pressure fluid enters and low-pressure fluid leaves said chambers, and thermal storage means in said fluid flow path, heat station means associated with said thermal storage means thereby to minimize temperature fluctuations in fluid entering and leaving said thermal storage means; said heat station means comprising a plurality of thermally bonded blocks, at least one of which has a passage therethrough, said passage being located in said flow path and containing stacked perforated disks thermally bonded to said block, and one-way valve means associated with said conduit means adapted to permit a portion of said low-pressure fluid to by-pass said passage and to force all of said low-pressure fluid leaving said chambers to pass through said passage.

27. Refrigeration apparatus comprising a plurality of cylinder means depending from a common cylinder head, displacer means movable within each of said cylinder means and depending from a common head plate, a head chamber defined by said cylinder head and said head plate, a plurality of refrigeration chambers defined by the bottoms of said displacer means and their respective cylinder means and variable in volume with the movement of said displacer means; conduit means connecting said head chamber with said refrigeration chambers, a plurality of thermal storage means associated with said conduit means; means for imparting predetermined motion to said head plate and thereby to said displacer means, the displacer motion being defined in four steps and consisting of dwelling in an uppermost position, moving downwardly, dwelling in a lowermost position and moving upwardly, respectively; supply reservoir means for supplying high-pressure fluid, exhaust reservoir means for receiving low-pressure fluid, and valve means associated with said supply and exhaust reservoir means and controlled to cause high-pressure fluid to enter said head chamber and said conduit during said first and second steps of said displacer motion, and to exhaust low-pressure fluid during said third and fourth steps of said displacer motion.

28. Refrigeration apparatus in accordance with claim 27 further characterized by having heat exchange means associated with said conduit thereby to extract refrigeration by means of a heat transfer fluid.

29. Refrigeration apparatus in accordance with claim 27 including insulating means surrounding at least that portion of said apparatus maintained at temperatures below ambient temperature during operation.

30. Refrigeration apparatus comprising a plurality of cylinder means of progressively smaller cross-section and longer lengths depending from a common cylinder head, displacer means movable within each of said cylinder means and depending from a common head plate movable within said cylinder head, a head chamber defined by said cylinder head and said head plate and variable in volume with the movement of said head plate; a plurality of refrigeration chambers having progressively smaller maximum volumes and defined by the bottom of said displacer means and their respective cylinder means and variable in volume with the movement of said displacer means; conduit means connecting said head chamber with said refrigeration chambers, thermal storage means associated with each of said refrigeration chambers and forming part of said conduit means; means for imparting predetermined motion to said head plate and thereby to said displacer means, the displacer motion being defined in four steps and consisting of dwelling in an uppermost position, moving downwardly, dwelling in a lowermost position and moving upwardly, respectively; supply reservoir means for supplying high-pressure fluid, exhaust reservoir means for receiving low-pressure fluid, valve means associated with said supply and exhaust reservoir means and controlled to cause high-pressure fluid to enter said head chamber and said conduit during said first and second steps of said displacer motion and to exhaust low-pressure fluid during said third and fourth steps of said displacer motion.

31. Apparatus in accordance with claim 30 further characterized by having that portion of the surface of said displacer means and the corresponding inside surface of said cylinder means exposed to temperatures below about 50° K. at least partially formed of a metal having a high heat capacity at said temperatures.

32. Refrigeration apparatus comprising a fluid refrigerating system in combination with and thermally bonded to a fluid heat transfer system, said fluid refrigerating system comprising a plurality of cylinder means depending from a common cylinder head, displacer means movable within each of said cylinder means and depending from a common head plate, a head chamber defined by said cylinder head and said head plate, a plurality of refrigeration chambers defined by the bottoms of said displacer means and their respective cylinder means and variable in volume with the movement of said displacer means, conduit means connecting said head chamber with said refrigeration chambers, a plurality of thermal storage means associated with said conduit means, means for imparting predetermined motion to said head plate and thereby to said displacer means, valve means connected and said conduit means for admitting compressed refrigerating fluid to and releasing refrigerating fluid from said head chamber and said refrigeration chambers, control means coordinating said displacer means and said valve means to supply a quantity of compressed refrigerating fluid to said conduit means while said displacer means causes said chambers to expand, said control means being timed thereafter to cause said displacer means and valve means to release pressure on the quantity of refrigerating fluid in said refrigeration chambers thereby to effect expansion and cooling of said quantity of refrigerating fluid; said fluid heat transfer system comprising first and second out-of-contact heat exchange means, said second heat exchange means being associated with said conduit means of said fluid refrigerating system whereby high pressure heat transfer fluid in said fluid heat transfer system is cooled subsequent to initial cooling in said first heat exchange means; expansion means adapted to further cool said heat transfer fluid; and return conduit means associated wtih said first heat exchange means adapted to return at least a portion of the low-pressure further cooled heat transfer fluid through said first heat exchange means whereby said high-pressure incoming heat transfer fluid is initially cooled.

33. Apparatus in accordance with claim 32 including insulating means surrounding at least that portion of said apparatus maintained at temperatures below ambient temperature during operation.

34. Refrigeration apparatus comprising a fluid refrigerating system in combination with and thermally bonded to a fluid heat transfer system, said fluid refrigerating system comprising a plurality of cylinder means depending from a common cylinder head, displacer means movable within each of said cylinder means and depending from a common head plate, a head chamber defined by said cylinder head and said head plate, a plurality of refrigeration chambers defined by the bottoms of said displacer means and their respective cylinder means and variable in volume with the movement of said displacer means, conduit means connecting said head chamber with said refrigeration chambers, a plurality of thermal storage means associated with said conduit means, means for imparting predetermined motion to said head plate and thereby to said displacer means, valve means connected to said conduit means for admitting compressed refrigerating fluid to and releasing refrigerating fluid from said head chamber and said refrigeration chambers, control means coordinating said displacer means and said valve means to supply a quantity of compressed refrigerating fluid to said conduit means while said displacer means causes said chambers to expand, said control means being timed thereafter to cause said displacer means and valve means to release pressure on the quantity of refrigerating fluid in said refrigeration chambers thereby to effect expansion and cooling of said quantity of refrigerating fluid; said fluid heat transfer system comprising a first heat exchange means adapted to furnish out-of-contact heat exchange between incoming high-pressure and out-going low-pressure heat transfer fluid of said fluid heat transfer system, and a second heat exchange means adapted to provide out-of-contact heat exchange between said high-pressure heat transfer fluid and said refrigerating fluid entering and released from said chambers whereby said high-pressure heat transfer fluid is progressively cooled; expansion means for expanding and further cooling said heat transfer fluid; and means for returning at least a portion of the low-pressure further cooled heat transfer fluid through said first heat exchange means.

35. Refrigeration apparatus comprising a fluid refrigerating system in combination with and thermally bonded to a fluid heat transfer system, said fluid refrigerating system comprising a plurality of cylinder means depending from a common cylinder head, displacer means movable within each of said cylinder means and depending from a common head plate, a plurality of refrigeration chambers defined by the bottoms of said displacer means and their respective cylinder means and variable in volume with the movement of said displacer means, conduit means connecting said head chamber with said refrigeration chambers, a plurality of thermal storage means associated with said conduit means, means for imparting predetermined motion to said head plate and thereby to said displacer means, valve means connected to said conduit means for admitting compressed refrigerating fluid to and releasing refrigerating fluid from said head chamber and said refrigeration chambers, control means coordinating said displacer means and said valve means to supply a quantity of compressed refrigerating fluid to said conduit means while said displacer means causes said chambers to expand, said control means being timed thereafter to cause said displacer means and valve means to release pressure on the quantity of refrigerating fluid in said refrigeration chambers thereby to effect expansion and cooling of said quantity of refrigerating fluid; said fluid heat transfer system comprising first and second out-of-contact heat exchange means, said second heat exchange means being associated with said conduit means of said fluid refrigerating system whereby high-pressure heat transfer fluid is cooled subsequent to initial cooling in said first heat exchange means; expansion means adapted to further cool said heat transfer fluid; return conduit means associated with said first heat exchange means adapted to return at least a portion of the low-pressure further cooled heat transfer fluid through said first heat exchange means whereby said high-pressure incoming heat transfer fluid is initially cooled; and auxiliary conduit means communicating between the coldest portion of said conduit means of said refrigerating system and said return conduit means of said heat transfer system and adapted to transfer a portion of said refrigerating fluid into said return conduit means.

36. Refrigeration apparatus comprising a fluid refrigerating system in combination with and thermally bonded to a fluid heat transfer system, said refrigeration system comprising a plurality of cylinder means depending from a common cylinder head, displacer means movable within each of said cylinder means and depending from a common head plate, a heat chamber defined by said cylinder head and said head plate, a plurality of refrigeration chambers defined by the bottom of said displacer means and their respective cylinder means and variable in volume with the movement of said displacer means, conduit means connecting said head chamber with said refrigeration chambers, a plurality of thermal storage means associated with said conduit means, a first high-pressure fluid reservoir means and a first low-pressure fluid reservoir means communicating with said conduit means, means for imparting predetermined motion to said head plate and thereby to said displacer means, valve means connected to said conduit means for admitting high-pressure refrigerating fluid to and releasing low-pressure refrigerating fluid from said chambers, control means coordinating said displacer means and valve means to supply a quantity of high-pressure refrigerating fluid to said conduit means while said displacer means causes said chambers to expand, said control means being timed thereafter to cause said displacer means and valve means to release pressure on the quantity of refrigerating fluid in said refrigeration chambers thereby to effect expansion and cooling of said quantity of refrigerating fluid; said heat transfer fluid system comprising a second high-pressure fluid reservoir means and a second low-pressure reservoir means; first and second out-of-contact heat exchange means, means for introducing high-pressure heat transfer fluid from said second high-pressure reservoir into said first heat exchange means and means for returning low-pressure heat transfer fluid to said second low-pressure reservoir from said first heat exchange means; said second heat exchange means being associated with said conduit means of said fluid refrigerating system whereby high-pressure heat transfer fluid in said fluid heat transfer system is cooled subsequent to initial cooling in said first heat exchange means, expansion means adapted to further cool said heat transfer fluid, return conduit means associated with said first heat exchange means adapted to return at least a portion of the low-pressure further cooled heat transfer fluid through said first heat exchange means whereby said high-pressure incoming heat transfer fluid is initially cooled.

37. Refrigeration apparatus in accordance with claim 36 wherein the refrigerating fluid and the heat transfer fluid are the same and said first and second high-pressure reservoirs are one and said first and second low-pressure reservoirs are one.

38. Refrigeration apparatus comprising a cylinder, displacer means movable in said cylinder and forming therewith relatively warm and cold chambers in said cylinder, said cylinder and said displacer means being provided with interfitting splines; means for admitting compressed fluid to said warm chamber, means for moving said displacer means to transfer fluid between said chambers, and means external of said cylinder for releasing pressure from said chambers thereby to allow expansion and cooling of the fluid therein without expending substantial energy in movement of said displacer means.

References Cited in the file of this patent

UNITED STATES PATENTS

| | | |
|---|---|---|
| 2,567,454 | Taconis | Sept. 11, 1951 |
| 2,906,101 | McMahon et al. | Sept. 29, 1959 |